United States Patent
Busch et al.

(10) Patent No.: US 9,850,626 B2
(45) Date of Patent: Dec. 26, 2017

(54) EXPANSION JOINT SEALS AND METHODS FOR MANUFACTURING THE SAME

(71) Applicant: LTBB Marketing, LLC, Lake Orion, MI (US)

(72) Inventors: Gary A. Busch, Ponte Vedra, FL (US); Gregory J. Beenen, Atlantic Beach, FL (US)

(73) Assignee: LTBB MARKETING, LLC, Lake Orion, MI (US)

(*) Notice: Subject to any disclaimer, the term of this patent is extended or adjusted under 35 U.S.C. 154(b) by 0 days.

(21) Appl. No.: 15/155,946

(22) Filed: May 16, 2016

(65) Prior Publication Data

US 2017/0328016 A1 Nov. 16, 2017

(51) Int. Cl.
*E01C 11/04* (2006.01)
*E01C 11/06* (2006.01)
(Continued)

(52) U.S. Cl.
CPC .............. *E01C 11/04* (2013.01); *E01C 11/06* (2013.01); *E01C 11/10* (2013.01); *B29C 47/065* (2013.01);
(Continued)

(58) Field of Classification Search
CPC .......... E01C 11/04; E01C 11/06; E01C 11/10; E01C 11/12; E01C 11/02; B29K 2021/006; E01D 19/06; E01D 19/00
See application file for complete search history.

(56) References Cited

U.S. PATENT DOCUMENTS 2,223,083 A * 11/1940 Malcom ................ E01C 11/126
 404/49
3,455,215 A * 7/1969 Webb ..................... E01C 11/106
 404/69
(Continued)

FOREIGN PATENT DOCUMENTS

DE 2709708 B1 5/1978
DE 102005039056 A1 2/2007
(Continued)

OTHER PUBLICATIONS

Smooth-On, "Durometer Shore Hardness Scale", https://www.smooth-on.com/, printed on May 15, 2016.
(Continued)

*Primary Examiner* — Abigail A Risic
(74) *Attorney, Agent, or Firm* — Vierra Magen Marcus LLP (57) ABSTRACT

An expansion joint seal includes a seal body and a plurality of seal caps, wherein the seal body is made of a material having a first hardness, and the seal caps are made of a material having a second hardness that is greater than the first hardness. The seal body includes a plurality of walls that form hollow cells. The seal body includes a plurality of traffic bearing surfaces that are separated from one another by grooves and are thereby discontinuous relative to one another. The hollow cells and the grooves allow the seal body to expand and contract as an expansion joint increases and decreases in size due to thermal and/or load variations. The seal caps cover the traffic bearing surfaces of the seal body, such that each of the traffic bearing surfaces of the seal body is covered by a separate one of the seal caps.

16 Claims, 5 Drawing Sheets

(51) Int. Cl.
*E01C 11/10* (2006.01)
*B29C 47/06* (2006.01)
*B29K 21/00* (2006.01)
*B29K 23/00* (2006.01)
*B29L 31/10* (2006.01)

(52) U.S. Cl.
CPC .... *B29K 2021/006* (2013.01); *B29K 2023/06* (2013.01); *B29K 2023/12* (2013.01); *B29K 2995/007* (2013.01); *B29L 2031/10* (2013.01)

(56) References Cited

U.S. PATENT DOCUMENTS

| | | | |
|---|---|---|---|
| 3,606,826 A * | 9/1971 | Bowman | E01C 11/126 404/49 |
| 3,887,292 A * | 6/1975 | Koster | E01C 11/126 14/73.1 |
| 4,022,538 A * | 5/1977 | Watson | E01C 11/126 404/67 |
| 4,030,156 A * | 6/1977 | Raymond | E01D 19/06 14/73.1 |
| 4,050,207 A * | 9/1977 | Bertschmann | E01D 19/06 404/68 |
| 4,131,382 A * | 12/1978 | Hymo | E01D 19/06 404/69 |
| 4,189,877 A * | 2/1980 | Jentoft | E04B 1/6815 52/396.07 |
| 4,533,278 A | 8/1985 | Corsover et al. | |
| 4,685,825 A | 8/1987 | Buckenauer | |
| 4,736,558 A | 4/1988 | Taraba, Jr. | |
| 4,781,003 A | 11/1988 | Rizza | |
| 4,916,878 A | 4/1990 | Nicholas | |
| 5,048,249 A | 9/1991 | Shreiner et al. | |
| 5,213,441 A | 5/1993 | Baerveldt | |
| 5,269,624 A | 12/1993 | Kramer | |
| 5,365,713 A | 11/1994 | Nicholas et al. | |
| 5,575,126 A | 11/1996 | Attaway et al. | |
| 5,584,152 A | 12/1996 | Baerveldt | |
| 5,628,857 A * | 5/1997 | Baerveldt | B29C 47/0019 156/244.25 |
| 6,039,503 A * | 3/2000 | Cathey | E01C 11/10 14/73.1 |
| 8,333,532 B2 | 12/2012 | Derrigan et al. | |
| 8,351,687 B1 | 1/2013 | Bradford et al. | |
| 8,671,489 B2 | 3/2014 | Gallai et al. | |
| 9,322,163 B1 | 4/2016 | Hensley | |
| 2005/0005553 A1* | 1/2005 | Baerveldt | E04B 1/6804 52/459 |
| 2005/0066600 A1 | 3/2005 | Moulton et al. | |
| 2006/0000174 A1* | 1/2006 | Edgman | E01C 11/106 52/396.02 |
| 2008/0307733 A1 | 12/2008 | Rice et al. | |
| 2008/0313989 A1* | 12/2008 | Ireland | E01C 11/10 52/396.04 |
| 2012/0141190 A1 | 6/2012 | Bailey | |
| 2015/0042047 A1 | 2/2015 | Winslow et al. | |

FOREIGN PATENT DOCUMENTS

WO WO2007/125556 A1 11/2007
WO 2011038434 A2 4/2011

OTHER PUBLICATIONS

International Search Report and the Written Opinion dated Jul. 11, 2017, in International Patent Application No. PCT/US2017/029205 filed Apr. 24, 2017.

* cited by examiner

EXPANSION JOINT SEALS AND METHODS FOR MANUFACTURING THE SAME

BACKGROUND

In many construction projects involving materials such as concrete and steel, gaps are left between adjacent structural elements (e.g., concrete or steel slabs) to allow for thermal expansion and contraction, wind sway, settlement, live load deflection, and/or seismic movements of the structural elements. By permitting expansion and contraction, the gaps prevent the structural materials and/or building cladding elements from cracking or buckling. These gaps, which are often referred to as expansion joints, expansion joint gaps, or movement joints, are typically sealed to prevent them from allowing the passage of water, dirt, debris, or snow, etc. into the structure and/or between portions of the structure. Such expansion joint gaps can be located between structural elements (e.g., slabs) that provide a horizontal surface (e.g., such as a road, sidewalk or plaza deck), a vertical surface (e.g., such as a wall) or a diagonal surface (e.g., such as a ramp). Expansion joint gaps may also be located between treads and risers of a seating bowl or a staircase, e.g., in a stadium or parking garage. The devices that are used to seal such expansion joints are often referred to as expansion joint seals.

SUMMARY

Embodiments of the present technology described herein are directed to expansion joint seals and methods for manufacturing expansion joint seals. Such expansion joint seals are for placement (at least partially) in an expansion joint between adjacent slabs or other structures that may move relative to one another due to thermal and/or load variations. Such adjacent slabs can be used to in roads, bridges, sidewalks, walls, ramps, parking garages, stadiums, buildings of any type and/or the like.

In accordance with certain embodiments, an expansion joint seal includes a seal body and a plurality of seal caps, wherein the seal body is made of a material having a first hardness, and the seal caps are made of a material having a second hardness that is greater than the first hardness. The seal body includes a plurality of walls that form hollow cells. The seal body also includes a plurality of traffic bearing surfaces that are separated from one another by grooves and are thereby discontinuous relative to one another. The hollow cells and the grooves allow the seal body to expand and contract as an expansion joint (also known as an expansion joint gap) between adjacent slabs or other structures increases and decreases in size due to thermal and/or load variations. The plurality of seal caps cover the plurality of traffic bearing surfaces of the seal body, such that each of the traffic bearing surfaces of the seal body is covered by a separate one of the seal caps.

In accordance with certain embodiments, the seal caps move closer to one another when the seal body contracts due to an expansion joint getting smaller, and the seal caps move farther apart from one another when the seal body expands due to an expansion joint getting larger.

In accordance with certain embodiments, the seal body is made of a first material having the first hardness, and the seal caps are made of a second material having the second hardness that is greater than the first hardness, wherein the second material is different than the first material. In other embodiments the seal body and the seal caps are made of a same type of material, but with a formulation and/or manufacturing process used to form the seal caps differing from a formulation and/or manufacturing process used to form the seal body, thereby resulting in the second hardness of the seal caps being greater than the first hardness of the seal body.

In accordance with certain embodiments, the material from which the seal body is made has a hardness within the range of 60 to 80 on the Shore "A" scale, and the material from which the seal caps are made has a hardness within the range of 80 to 100 on the Shore "D" scale.

In accordance with certain embodiments, the seal body and the seal caps are coextruded. Alternatively, the seal body and the seal caps are formed separately and the seal caps are adhered to the traffic bearing surfaces of the seal body using an epoxy or other adhesive. In accordance with certain embodiments, one or more of the seal caps are a different color than the seal body.

In accordance with certain embodiments, the expansion joint seal also includes first and second attachment elements extending from opposing sides of the seal body and configured to hold the seal body in place between adjacent slabs or other structures that may move relative to one another due to thermal and/or load variations. In such embodiments, each of the first and second attachment elements can include a respective traffic bearing surface that is also covered by the material having the second hardness that is greater than the first hardness. In other words, seal caps can also cover portions of the attachment elements.

Certain embodiments of the present technology are also related to methods for manufacturing expansion joint seals, e.g., of the kinds summarized above.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

An expansion joint seal may have a seal body made of a material that is elastomeric so that wall structures of the seal body can be compressed and expanded without cracking, breaking or otherwise permanently deforming the seal body. For example, an expansion joint seal body that expands and contracts may have a hardness of about 60 to 80 on the Shore "A" scale. Examples of suitable elastomeric materials that can be used to make an expandable and compressible elastomeric seal body include thermoset and thermoplastic rubber compounds. Exemplary thermoplastics are manufactured by Monsanto under the trademark "Santoprene" and by DuPont under the trademark "Alcryn". However, the use of other elastomeric materials is also possible.

When expansion joint seals are included in roadways, bridges, parking garages, sidewalks, plaza decks, stadiums, or the like, the expansion joint seals may be subjected to vehicle and/or pedestrian traffic (which can be individually or collectively referred to simply as traffic) that pass over the expansion joint seals. Such traffic, depending upon its frequency, weight, roughness and/or other factors, may adversely affect the structural integrity and the useful life of the expansion joint seals. When expansion joint seals crack or otherwise break, they may allow the passage of water, chlorides, dirt, debris, or snow, etc. into a structure (e.g., roadway) and/or between portions of the structure, which can adversely affect the strength and/or useful life of the structure. Replacing damaged expansion joint seals is often time consuming and expensive, and may be very inconvenient where the structure including the expansion joint seals is used on a daily basis. Accordingly, it would be beneficial if the useful life of expansion joint seals can be extended.

In the description that follows, like numerals or reference designators will be used to refer to like parts or elements throughout. In addition, the first digit of a three digit reference number identifies the drawing in which the reference number first appears.

Figure 1:
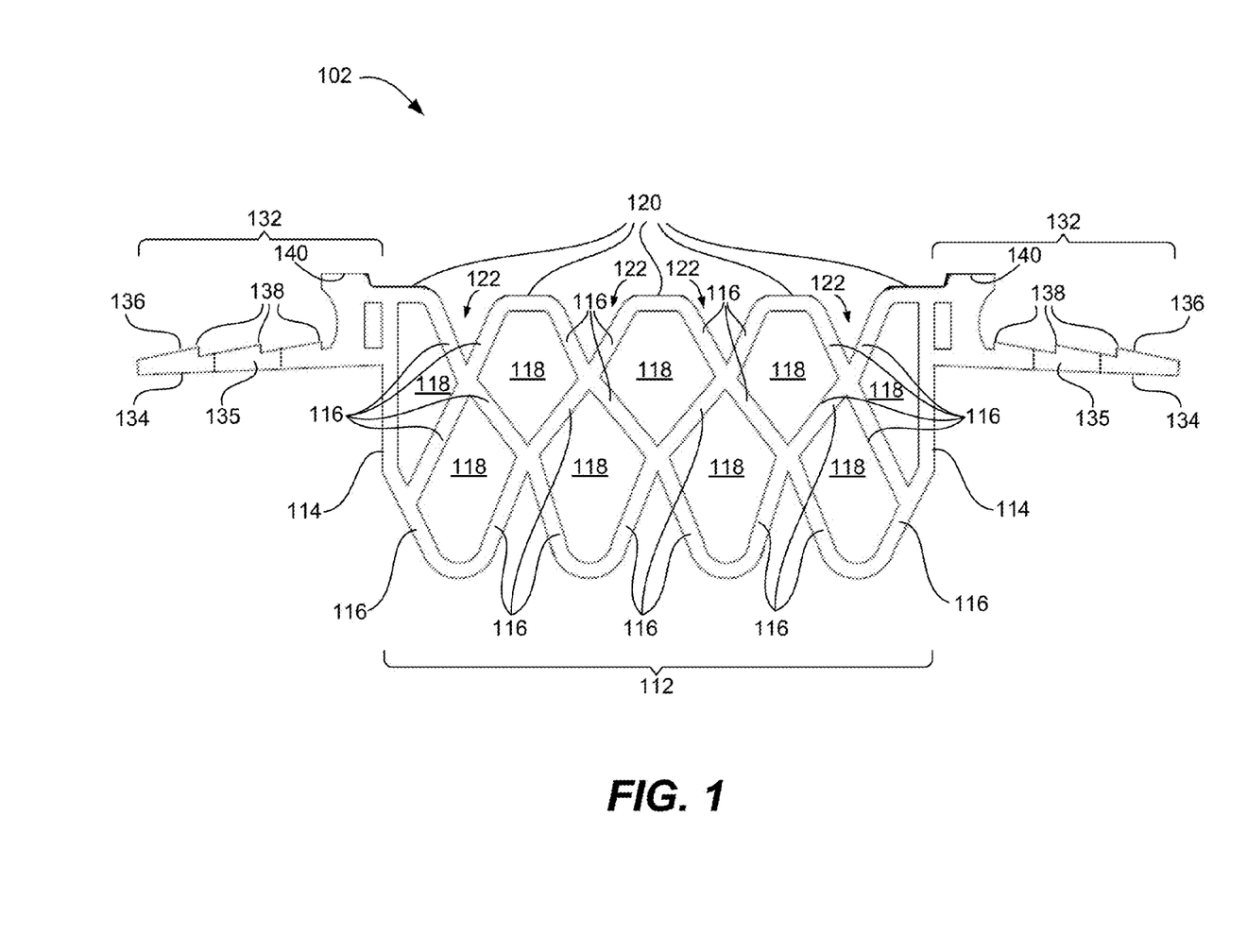
FIG. 1 is a section view of an exemplary expansion joint seal.

FIG. 1 is a section view of an exemplary expansion joint seal 102. The expansion joint seal 102 is shown as including an expansion joint seal body 112 from which a pair of attachment elements 132 extend. The expansion joint seal body 112, which can also be referred to more succinctly as the seal body 112, is shown as having a pair of side walls 114 and also having internal walls 116 that collectively form hollow cells 118. The pair of sidewalls 114 are intended to abut against sides of adjacent the slabs or other structures having an expansion joint therebetween within which the seal body 112 is inserted. The internal walls 116, hollow cells 118 and grooves 122 (described below) are designed to allow the seal body 112 to expand and contract as the gap (also known as the expansion joint) between adjacent slabs or other structures increases and decreases in size due to thermal and/or load variations.

The seal body 112 is also shown as including traffic bearing surfaces 120, which are surfaces of the seal body 112 that are exposed and would come into contact with traffic that passes over the expansion joint seal 102. In FIG. 1, the seal body 112 is shown as including five traffic bearing surfaces 120, but may include as few as three traffic bearing surfaces 120, or more than five traffic bearing surfaces 120, depending upon the size of the gap that is being sealed, and depending upon the overall structural configuration of the expansion joint seal. More specifically, the seal body 112 includes a leftmost traffic bearing surface 120, a right most traffic bearing surface 120, and three intermediate traffic bearing surfaces 120. It would be possible for there to be as few one intermediate traffic bearing surfaces, or more than three intermediate traffic bearing surfaces. As can be appreciated from FIG. 1, the traffic bearing surfaces 120 of the seal body 112 in FIG. 1 are portions of the outer surfaces (e.g., upper surfaces) of some of the internal walls 116 of the seal body 112, with inner surfaces of such internal walls 116 defining the boundaries of some of the hollow cells 118. It is the traffic bearing surfaces 120 of the seal body 112 that are most susceptible to damage that may be caused by traffic that passes over the expansion joint seal 102.

Still referring to FIG. 1, the traffic bearing surfaces 120 are shown as being discontinuous relative to one another, in that they are separated from one another by grooves 122. The grooves 122, along with the hollow cells 118, allow for the expansion and contraction of the seal body 112. The material from which the internal walls 116 are made should be sufficiently flexible so that the internal walls 116 do not crack, break or otherwise permanently deform when the seal body 112 expands and contracts. The sidewalls 114 are most likely made of the same material as the internal walls 116, so that the sidewalls and internal walls 116 can be made using a single extrusion process without any seams therebetween. Further, the attachment elements 132 are also likely made of the same material as the sidewalls 114 and the internal walls 116, so that the sidewalls 114, the internal walls 116 and the attachment elements 132 can be made using a single extrusion process without any seams therebetween.

Still referring to FIG. 1, each of the attachment elements 132, which resemble a wing or flap, is shown as including a bottom surface 134 which is intended to rest on upper surfaces of block out areas in concrete slabs or other types of structures. Each of the attachment elements 132 is also shown as including a top surface 136 on which are located sawtooth shaped ribs 138, but which ribs may also have alternative shapes. The ribs 138 help hold the expansion joint seal 102 in place after the block out areas are filled with an elastomeric concrete or other header material. The wing like attachment elements 132 can also include spaced apart perforations 135 (e.g., holes) that extend between the bottom and top surfaces 134 and 136. Such perforations 135 can be filled with an adhesive material and/or elastomeric concrete or other header material and help hold the expansion joint seal 102 in place. The perforations 135, or other openings in the attachment element 132, may also be used to bolt the attachment elements 132 to concrete slabs or other types of structures. In the embodiment shown in FIG. 1, each of the attachment elements 132 includes a respective traffic bearing surface 140 that rests above the blockout area after the blockout area is filled with an elastomeric concrete or other header material.

Figure 2:
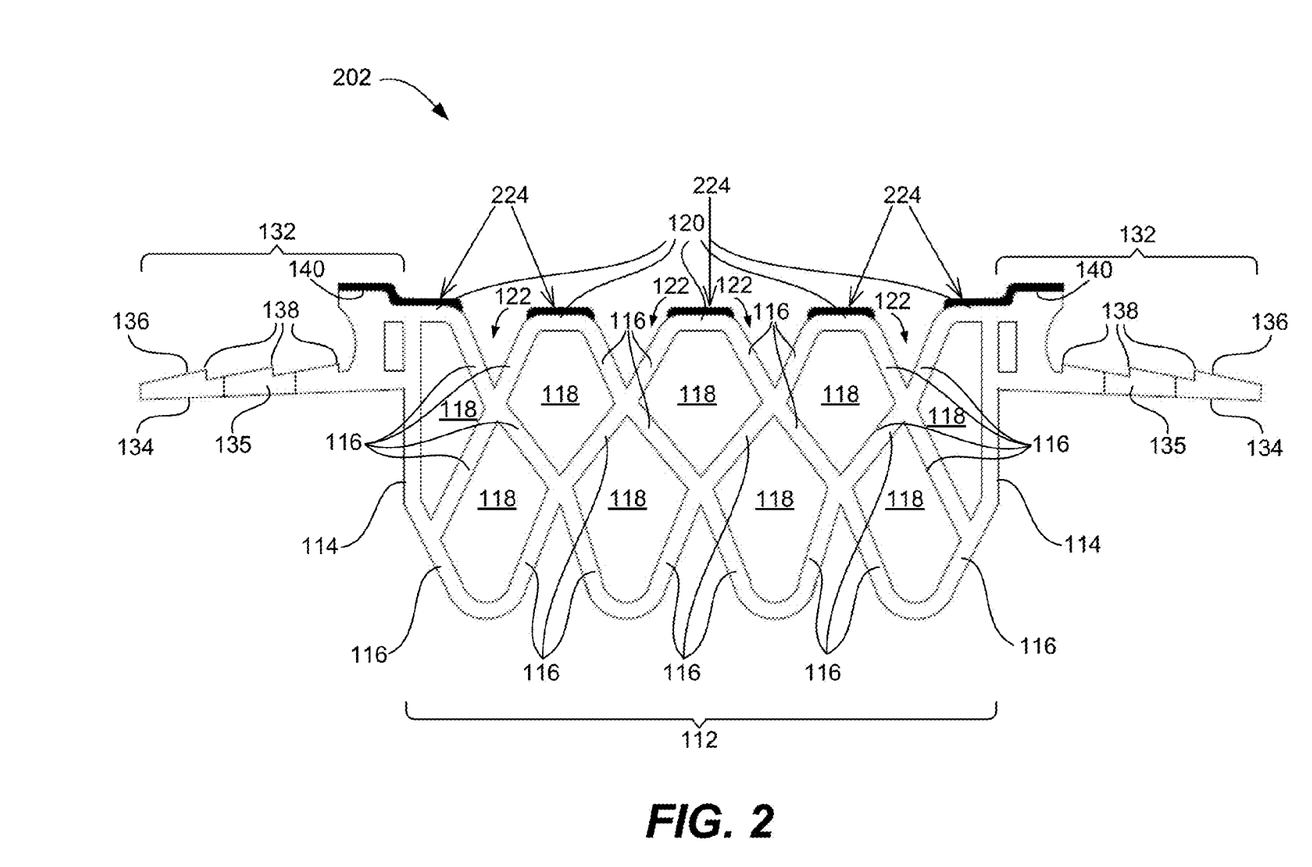
FIG. 2 is a section view of an expansion joint seal of an embodiment of the present technology.

FIG. 2 is a section view of an expansion joint seal 202 according to an embodiment of the present technology. Elements shown in FIG. 2 that are the same as (or substantially similar to) those already described above with reference to FIG. 1 are labeled the same manner, and are not described again, or at least to the same extent as already described. In the embodiment of FIG. 2, each of the traffic bearing surfaces 120 of the expansion joint seal 202 is covered with a respective seal cap 224 that is made of a material that is harder (i.e., has a greater hardness) than the material from which the underlying seal body 112 is made. Because the material from which the seal caps 224 are made is harder than the material from which the underlying seal body 112 is made, the seal caps 224 are beneficially less vulnerable to being damaged by traffic that passes over the expansion joint seal 202. In other words, the seal caps 224 are more resistant to being damaged by contact with traffic than the underlying seal body 112 would be if the seal caps 224 were not present. Accordingly, the seal caps 224 protect the underlying seal body 112, and thereby extend the useful life of the expansion joint seal 202.

Figure 3:
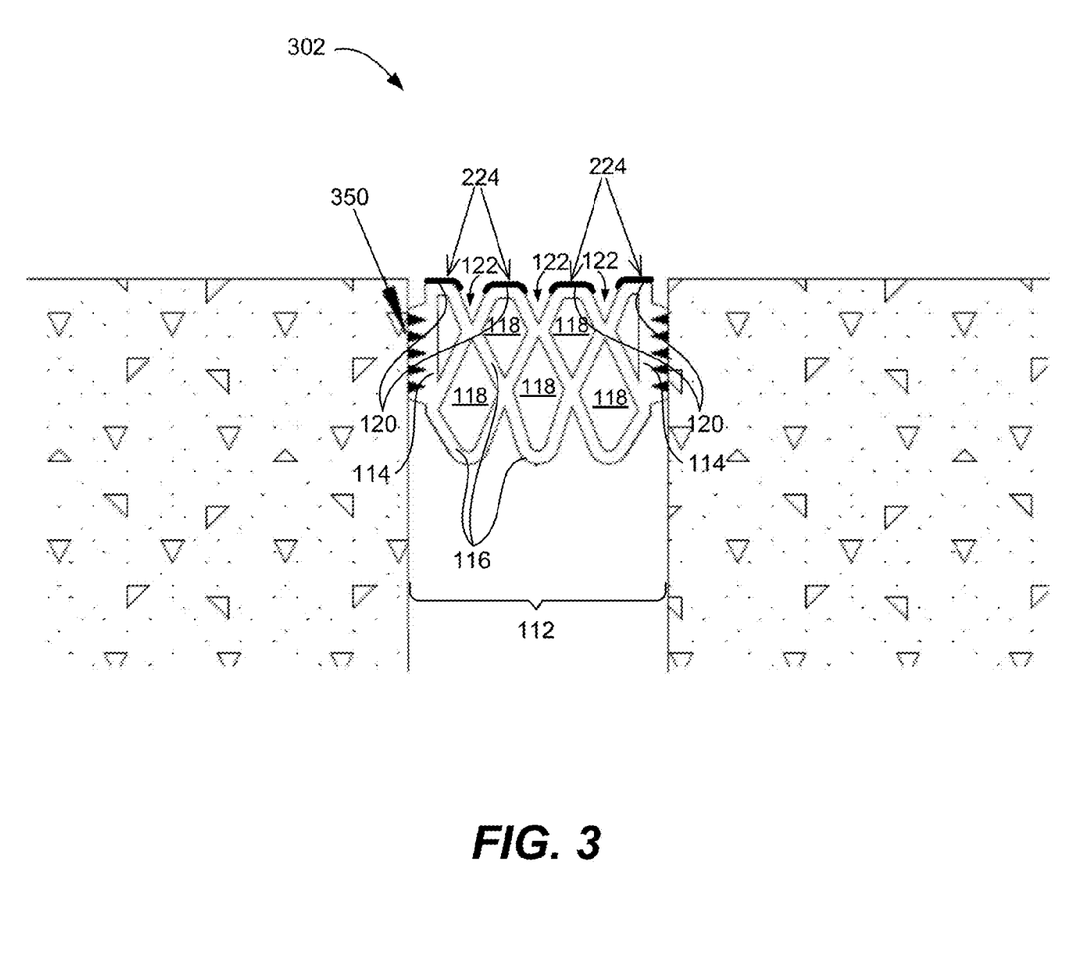
FIG. 3 is a section view of an expansion joint seal of another embodiment of the present technology.
Figure 4:
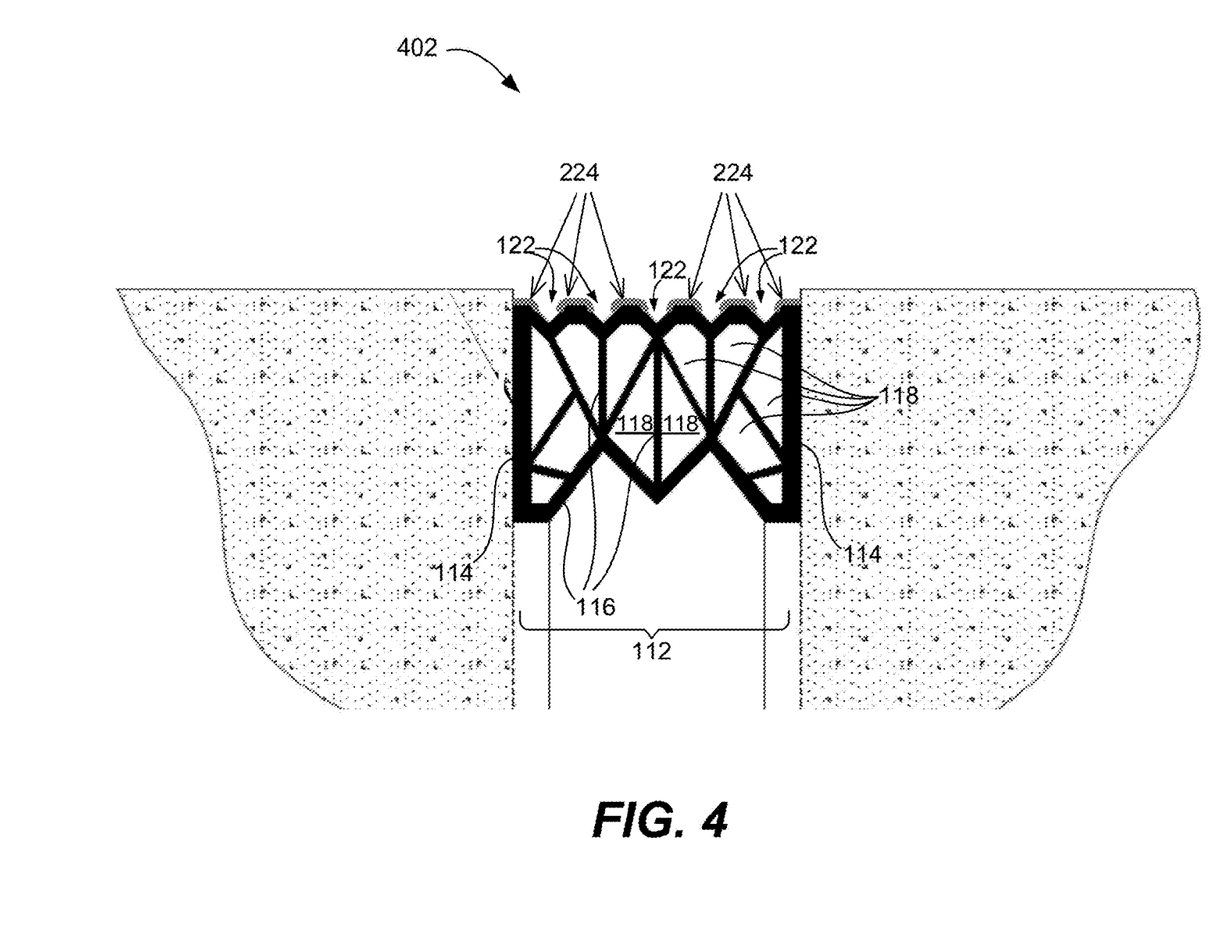
FIG. 4 is a section view of an expansion joint seal of still another embodiment of the present technology.

It is noted that in the embodiments of FIG. 2-4, surfaces of the seal body 112 (or attachment elements 132) that are covered by seal caps 224 are still referred to as traffic bearing surfaces 120 (or 140), even though the traffic will actually contact the seal caps 224 rather than the portions of the seal body 112 (or attachment elements 132) covered by the seal caps 224. Accordingly, in such embodiments, the traffic bearing surfaces are more accurately surfaces of the seal body (or attachment elements) that, if not covered by the seal caps 224, would come into contact with traffic that passes over the expansion joint seal 102.

As can be appreciated from FIG. 2, the grooves 122 that separate the traffic bearing surfaces 120 also separate the seal caps 224 from one another. To enable the hollow cells 118 to expand and contract, outer surfaces of the grooves 122, or at least a majority thereof, are not covered with the harder material from which the seal caps 224 are made. Rather, the harder material from which the seal caps 224 are made preferably only cover surfaces of the expansion joint seal 202 that are designed to substantially retain their shape as other portions of the expansion joint seal 202 change shape due to expansion or contraction of an expansion joint gap.

In accordance with certain embodiments of the present technology, the traffic bearing surface 140 of each of the attachment elements 132 is also covered by a respective seal cap 224, to thereby protect the underlying traffic bearing surface 140 of the attachment elements 132 that would otherwise be directly exposed to traffic passing thereover.

In accordance with certain embodiments, an upper surface the seal caps 224 can be smooth. Alternatively, the upper surface the seal caps 224 can have bumps, shallow grooves, and/or some other type of textured surface to provide for an increased coefficient of friction, compared to if the upper surface were smooth. This may be useful, e.g., where pedestrian traffic will pass over the expansion joint seal 202, because it can reduce the chances that pedestrians may slip when stepping on the expansion joint seal 202.

In accordance with certain embodiments, the seal body 112 is made of a first material having the first hardness, and the seal caps 224 are made of a second material having the second hardness that is greater than the first hardness, wherein the second material is different than the first material. For example, the material from which the seal body 112 is made can be a thermoset, polychloroprene rubber material. Preferably, such a polychloroprene rubber material meets the physical requirements outlined in the ASTM D3542-82 standard. More generally, in accordance with certain embodiments the material from which the seal body 112 is made is a thermoplastic or thermoset material having a hardness within the range of 60 to 80 on the Shore "A" scale, and more preferably, has a hardness of 65 on the Shore "A" scale. Such a material is preferably extrudable so that the seal body 112 can be readily made using an extrusion mold.

In accordance with certain embodiments, the material from which the seal caps 224 are made can be a thermoplastic or thermoset material having a hardness within the range of 80 to 100 on the Shore "D" scale, and more preferably, has a hardness of 90 on the Shore "D" scale. It is also within the scope of the embodiments described herein that the material from which the seal caps 224 are made has a hardness that is even greater than 100 on the Shore "D" scale. Preferably, the material from which the seal caps 224 are made is at least twice as hard as the material from which the seal body 112 is made. More preferably, the material from which the seal caps 224 are made is at least five times as hard as the material from which the seal body 112 is made. The material from which the seal caps 224 are made can be, e.g., a thermoplastic rubber of high density or ultrahigh density polyethylene or polypropylene, but is not limited thereto. Such a material is preferably extrudable so that the seal caps 224 can be readily made using an extrusion mold.

It would also be possible that the seal body 112 and the seal caps 224 are made of a same type of material, but with a formulation and/or manufacturing process used to form the seal caps 224 differing from a formulation and/or manufacturing process used to form the seal body 112, thereby resulting in the hardness of the seal caps 224 being greater than the hardness of the seal body 112.

In accordance with certain embodiments, the seal body 112 and the seal caps 224 are simultaneously coextruded using adjacent extrusion molds. In such embodiments, the seal caps 224 can thermally and/or chemically adhere to the traffic bearing surfaces 120 of the seal body 224 (and potentially also to the traffic bearing surfaces 140 of attachment elements 132) without the use of a separate adhesive. Alternatively, the seal body 112 and the seal caps 224 can be separately extruded, or otherwise formed, and the seal caps 224 can thereafter be adhered to the traffic bearing surfaces 120 of the seal body 224 (and potentially also to the traffic bearing surfaces 140 of attachment elements 132) using an epoxy or other adhesive. It would also be possible to extrude the seal body 112 and dispense or otherwise apply the seal cap material in a liquid form directly onto the traffic bearing surfaces 120 of the seal body 224 (and potentially also to the traffic bearing surfaces 140 of attachment elements 132) after which the seal cap material would cure or otherwise solidify. Other variations are also possible, and within embodiments of the present technology described herein.

In accordance with certain embodiments, the seal caps 224 are a different color than the seal body 112. For example, the seal body 112 can be black, and the seal caps can be red, green, blue, or some other color. In other words, the seal caps 224 may be colorized in order to draw attention to the existence of the expansion joint seal for safety reasons or for purposes of design esthetics. It is also possible that the seal caps 224 are the same color as the seal body 112, in which case, the fact that the seal caps 224 exist may not be readily noticeable to a casual observer. It is also possible that different ones of the seal caps 224 have different colors than one another.

In accordance with certain embodiments, the material from which the seal caps 224 are made is more resistant to ultraviolet (UV) radiation than the material from which the seal body 112 is made. In such embodiments, the seal caps 224 can provided added UV protection to the underlying seal body 112 and/or attachment elements 132.

FIGS. 1 and 2 show just one exemplary profile of an expansion joint seal. FIG. 3 shows a profile of an alternative expansion joint seal 302. Elements shown in FIG. 3 that are the same as (or substantially similar to) those already described above with reference to FIG. 1 or 2 are labeled the same manner, and are not described again or at least to the same extent as previously described.

Referring to FIG. 3, the expansion joint seal 302 shown therein includes a seal body 112 including traffic bearing surfaces 120, which are surfaces of the seal body 112 that are exposed and that would come into contact with traffic that passes over the expansion joint seal 302. As in FIGS. 1 and 2, the seal body 112 includes sidewalls 114 and internal walls 116 that form hollow cells 118. Further, the traffic bearing surfaces 120 are shown as being discontinuous relative to one another, in that they are separated from one another by grooves 122. The grooves 122, along with the hollow cells 118, allow for the expansion and contraction of the seal body 112. One way in which the expansion joint seal 302 differs from the expansion joint seals 102 and 202 is that the expansion joint seal 102 does not include wing or flap shaped attachment elements 132. Rather, the expansion joint seal 302 has outwardly facing sawtooth shaped ribs 350 on the sidewalls 114 of the seal body 112, which enable an epoxy or other adhesive to hold the expansion joint seal 302 between surfaces of adjacent slabs or other structures between which an expansion joint is located.

In a similar manner as was discussed above, with reference to FIG. 2, in the embodiment of FIG. 3 the traffic bearing surfaces 120 of the expansion joint seal 302 are covered with seal cap 224 that is made of a material that is harder (i.e., has a greater hardness) than the material from which the underlying seal body 112 is made. Because the material from which the seal caps 224 are made is harder than the material from which the underlying seal body 112 is made, the seal caps 224 are beneficially less vulnerable to being damaged by exposure to the elements and/or traffic that passes over the expansion joint seal 202. In other words, the seal caps 224 are more resistant to being damaged by contact with traffic and/or environmental exposure than the underlying seal body 112 would be if the seal caps 224 were not present. Accordingly, the seal caps 224 protect the underlying seal body 112, and thereby extend the useful life of the expansion joint seal 302.

FIG. 4 shows a profile of an alternative expansion joint seal 402. Elements shown in FIG. 4 that are the same as (or substantially similar to) those already described above with reference to FIG. 1, 2 or 4 are labeled the same manner, and are not described again or at least to the same extent as previously described. Referring to FIG. 4, the expansion joint seal 402 shown therein includes a seal body 112 including traffic bearing surfaces 120, which are surfaces of the seal body 112 that would come into contact with traffic that passes over the expansion joint seal 302. As in FIGS. 1 and 2, the seal body 112 includes sidewalls 114 and internal walls 116 the form hollow cells 118. However, in contrast to the previously described embodiments, the walls are linear and meet at sharp angles, rather than at smooth curves. Further, the circumference of the hollow cells 118 also include sharp angles, rather than smooth curves. The expansion joint seal 402 shown in FIG. 4 may be referred to as a "compression seal expansion joint," since it is configured to be compressed into place within an expansion joint gap.

As was the case in the previously described embodiments, the traffic bearing surfaces 120 are shown as being discontinuous relative to one another, in that they are separated from one another by grooves 122. The grooves 122, along with the hollow cells 118, allow for the expansion and contraction of the seal body 112.

In a similar manner as was discussed above, with reference to FIGS. 2 and 3, in the embodiment of FIG. 4 the traffic bearing surfaces 120 of the expansion joint body 112 are covered with seal cap 224 that are made of a material that is harder (i.e., has a greater hardness) than the material from which the underlying seal body 112 is made. Because the material from which the seal caps 224 are made is harder than the material from which the underlying seal body 112 is made, the seal caps 224 are beneficially less vulnerable to being damaged by traffic that passes over the expansion joint seal 202. In other words, the seal caps 224 are more resistant to being damaged by contact with traffic than the underlying seal body 112 would be if the seal caps 224 were not present. Accordingly, the seal caps 224 protect the underlying seal body 112, and thereby extend the useful life of the expansion joint seal 402.

Profiles for expansion joint seals, which differ from the profiles shown in FIGS. 1-4, can also be used while being within the scope of the embodiments described herein. In other words, the embodiments described herein also encompass expansion joint seals having other profiles, wherein the traffic bearing surfaces of the expansion joint seal are covered with seal caps that are made of a material that is harder (i.e., has a greater hardness) than the material from which the underlying seal body is made.

Preferably, the expansion joint seals described herein can be shipped in rolls, and then unrolled at the site where they are to be installed. Beneficially, the seal caps 224 described herein do not interfere with the ability for the expansion joint seals to be rolled and unrolled.

It is noted that in the embodiments of FIG. 2-4, and the methods described below, surfaces of the seal body 112 (or attachment elements 132) that are covered by seal caps 224 are still referred to as traffic bearing surfaces 120 (or 140), even though the traffic would actually contact the seal caps 224 rather than the portions of the seal body 112 (or attachment elements 132) covered by the seal caps 224. Accordingly, in such embodiments, the traffic bearing surfaces can be more accurately described as surfaces of the seal body (or attachment elements) that, if not covered by the seal caps 224, would come into contact with traffic that passes over the expansion joint seal 102. As noted above, expansion joint gaps can be located between structural elements (e.g., slabs) that provide a horizontal surface (e.g., such as a road, sidewalk or plaza deck or a building separation), a vertical surface (e.g., such as a wall) or a diagonal surface (e.g., such as a ramp). Accordingly, the expansion joint seals of embodiments of the present technology, when placed between adjacent slabs or other structural elements may be positioned horizontally (e.g., as shown in FIGS. 2-4), vertically (e.g., rotated by 90 degrees compared to what is shown in FIGS. 2-4), or at a diagonal angle (e.g., rotated by 20 degrees compared to what is shown in FIGS. 2-4). When the expansion joint seals described herein are positioned horizontally or diagonally, the traffic bearing surfaces 120 of a seal body 112 (if not covered by the seal caps 224) are most likely to be passed over by pedestrian or vehicle traffic. However, when positioned vertically (e.g., in a wall), the expansion joint seals described herein are unlikely to actually be passed over by pedestrian or vehicle traffic, and thus, the traffic bearing surfaces 120 (and more specifically, the seal caps 224 covering them) of a seal body 112 are unlikely to actually be passed over by pedestrian or vehicle traffic. Nevertheless, the surfaces 120 of the seal body 112 (even where the expansion joint seal is positioned vertically) are still referred to as traffic bearing surfaces 120, since they would be the surfaces most susceptible to damage if traffic did indeed pass over the expansion joint seals.

An expansion joint seal may be configured to be located between a first structural element that is horizontal and a second structural element that is vertical. For example, an expansion joint seal may be used in an expansion joint gap between a tread and a riser of a seating area or a staircase, e.g., in a stadium, parking garage, or the like. With such an expansion joint seal, the traffic bearing surfaces of the seal body are the surfaces, between exposed outer grooves in the seal body, which may come into contact with maintenance equipment, the toes of shoes as people walk up a staircase, or come into contact with the heels of shoes as people walk down the staircase. The seal caps described herein can also be used to protect the traffic bearing surfaces of an expansion joint seal used in a gap between a tread and a riser (or more generally, in a gap between horizontal and vertical structures that are adjacent to one another), to thereby extend the useful life of these types of expansion joint seals. For another example, the seal caps described herein can also be used to protect the traffic bearing surfaces of an expansion joint seal used in an expansion joint gap between a floor and a wall.

Figure 5:
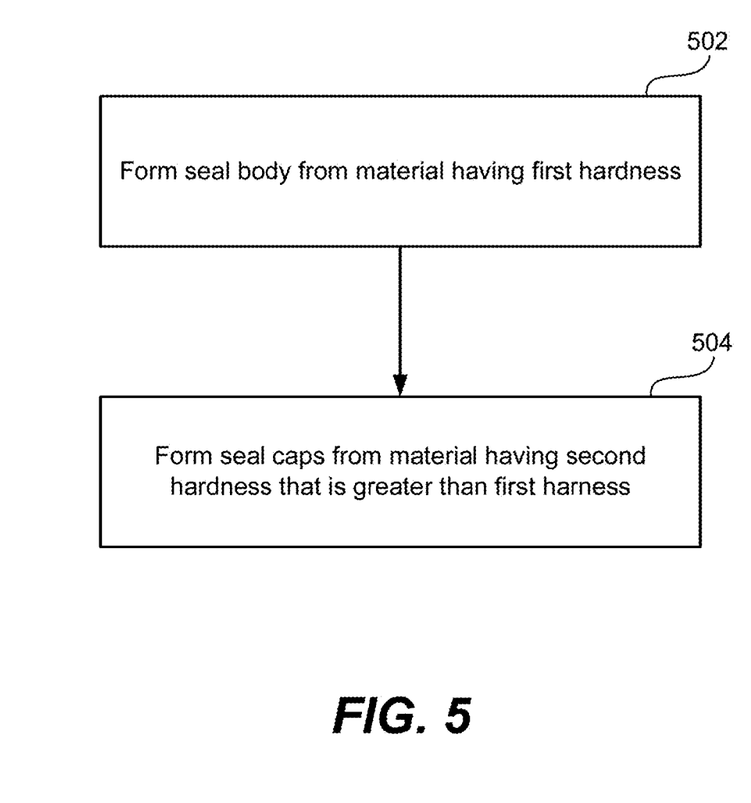
FIG. 5 is a high level flow diagram that is used to summarize methods for manufacturing an expansion joint seal according to certain embodiments of the present technology. of the present technology.

FIG. 5 is a high level flow diagram that is used to summarize methods for manufacturing an expansion joint seal according to certain embodiments of the present technology. Referring to FIG. 5, step 502 involves forming a seal body (e.g., 112) from a material having a first hardness. As was described above, the seal body formed at step 502 can include a plurality of walls that from hollow cells and a plurality of traffic bearing surfaces that are separated from one another by grooves and are thereby discontinuous relative to one another.

Still referring to FIG. 5, step 504 involves forming seal caps (e.g., 224) from a material having a second hardness that is greater than the first harness. As was described above, the seal caps formed at step 504 can cover the plurality of traffic bearing surfaces of the seal body, such that each of the traffic bearing surfaces of the seal body is covered by a separate one of the seal caps.

In accordance with certain embodiments, step 502 involves extruding the seal body using a first extrusion mold, and step 504 involves extruding the seal cap using a second extrusion mold. In certain embodiments, steps 502 and 504 are performed simultaneously during a coextrusion process. In accordance with certain embodiments, the material from which the seal body is made at step 502 has a hardness within the range of 60 to 80 on the Shore "A" scale, and the material from which the seal caps are made at step 504 has a hardness within the range of 80 to 100 on the Shore "D" scale. Additional and alternative details of such methods can be appreciated from the above discussion of FIGS. 1-4.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An expansion joint seal for placement at least partially in an expansion joint between adjacent slabs or other structures that may move relative to one another due to thermal and/or load variations, the expansion joint seal comprising:
   an extruded seal body including a plurality of walls that form hollow cells;
   the extruded seal body also including at least four traffic bearing surfaces that are separated from one another by at least three grooves and are thereby discontinuous relative to one another; and
   at least four extruded seal caps that cover the at least four traffic bearing surfaces of the extruded seal body, such that each of the traffic bearing surfaces of the extruded seal body is covered by a separate one of the extruded seal caps;
   wherein the hollow cells and the grooves allow the extruded seal body to expand and contract as an expansion joint between adjacent slabs or other structures increases and decreases in size due to thermal and/or load variations;
   wherein the extruded seal body and the extruded seal caps are coextruded;
   wherein the extruded seal body is made of a material having a first hardness;
   wherein the extruded seal caps are made of a material having a second hardness that is greater than the first hardness;
   wherein the expansion joint seal comprising the extruded seal body and the extruded seal caps is capable of being rolled and unrolled so that the expansion joint seal can be shipped in a roll and thereafter unrolled at a site where the expansion joint seal is to be installed; and
   wherein the extruded seal caps of the expansion join seal do not interfere with the ability for the expansion joint seal to be rolled and unrolled.

2. The expansion joint seal of claim 1, wherein:
   the extruded seal caps move closer to one another when the seal body contracts due to an expansion joint getting smaller; and
   the extruded seal caps move farther apart from one another when the seal body expands due to an expansion joint getting larger.

3. The expansion joint seal of claim 1, wherein:
   the extruded seal body is made of a first material having the first hardness;
   the extruded seal caps are made of a second material having the second hardness that is greater than the first hardness; and
   the second material is different than the first material.

4. The expansion joint seal of claim 1, wherein the extruded seal body and the extruded seal caps are made of a same type of material, but with a formulation and/or manufacturing process used to form the extruded seal caps differing from a formulation and/or manufacturing process used to form the extruded seal body, thereby resulting in the second hardness of the extruded seal caps being greater than the first hardness of the extruded seal body.

5. The expansion joint seal of claim 1, wherein:
   the material from which the extruded seal body is made has a hardness within the range of 60 to 80 on the Shore "A" scale; and
   the material from which the extruded seal caps are made has a hardness within the range of 80 to 100 on the Shore "D" scale.

6. The expansion joint seal of claim 1, wherein one or more of the extruded seal caps are a different color than the extruded seal body.

7. The expansion joint seal of claim 1, further comprising:
   first and second attachment elements extending from opposing sides of the extruded seal body and configured to hold the extruded seal body in place between adjacent slabs or other structures that may move relative to one another due to thermal and/or load variations; and
   wherein each of the first and second attachment elements includes a respective traffic bearing surface that is also covered by the material having the second hardness that is greater than the first hardness.

8. The expansion joint seal of claim 6, wherein the material having a second hardness is a different color than the material having the first hardness.

9. An expansion joint seal comprising:
   an extruded seal body including a plurality of traffic bearing surfaces that are discontinuous relative to one another;
   a plurality of extruded seal caps that cover the plurality of traffic bearing surfaces of the extruded seal body, such that each of the traffic bearing surfaces of the extruded seal body is covered by a separate one of the extruded seal caps;
   wherein the extruded seal body and the extruded seal caps are coextruded;
   wherein the extruded seal body is made of a first material having a first hardness;

wherein the extruded seal caps that cover the traffic bearing surfaces of the extruded seal body are made of a second material having a second hardness that is at least twice as hard as the first hardness; and wherein the expansion joint seal comprising the extruded seal body and the extruded seal caps is capable of being rolled and unrolled so that the expansion joint seal can be shipped in a roll and thereafter unrolled at a site where the expansion joint seal is to be installed.

10. The expansion joint seal of claim 9, wherein:
the plurality of traffic bearing surfaces of the extruded seal body are separated from one another by grooves; and
at least a majority of the exposed surfaces of each of the grooves are not covered by extruded seal caps that are made of the second material having the second hardness.

11. The expansion joint seal of claim 9, wherein:
the first material has a hardness within the range of 60 to 80 on the Shore "A" scale; and
the second material has a hardness within the range of 80 to 100 on the Shore "D" scale.

12. The expansion joint seal of claim 9, wherein:
the traffic bearing surfaces of the extruded seal body, which are covered by the extruded seal caps made of the second material, move closer to one another when the extruded seal body contracts; and
the traffic bearing surfaces of the extruded seal body, which are covered by the extruded seal caps made of the second material, move farther apart from one another when the extruded seal body expands.

13. A method for manufacturing an expansion joint seal capable of being rolled and unrolled so that the expansion joint seal can be shipped in a roll and thereafter unrolled at a site where the expansion joint seal is to be installed, the method comprising:

(a) extruding, from a material having a first hardness, a seal body including a plurality of walls that form hollow cells and a plurality of traffic bearing surfaces that are separated from one another by grooves and are thereby discontinuous relative to one another; and (b) extruding, from a material having a second hardness that is greater than the first harness, seal caps to cover the plurality of traffic bearing surfaces of the seal body, so that each of the traffic bearing surfaces of the seal body is covered by a separate one of the seal caps;

wherein steps (a) and (b) are performed simultaneously during a coextrusion process;

wherein the expansion joint seal resulting from steps (a) and (b) is capable of being rolled and unrolled; and wherein the extruded seal caps extruded at step (b) do not interfere with the ability for the expansion joint seal resulting from steps (a) and (b) to be rolled and unrolled.

14. The method of claim 13, wherein:
step (a) comprises extruding the seal body using a first extrusion mold; and
step (b) comprises extruding the seal cap using a second extrusion mold.

15. The method of claim 13, wherein the material from which the extruded seal body is made at step (a) is at least twice as hard as the material from which the extruded seal caps are made at step (b).

16. The method of claim 13, wherein:
the material from which the extruded seal body is made at step (a) has a hardness within the range of 60 to 80 on the Shore "A" scale; and
the material from which the extruded seal caps are made at step (b) has a hardness within the range of 80 to 100 on the Shore "D" scale.

* * * * *

UNITED STATES PATENT AND TRADEMARK OFFICE
CERTIFICATE OF CORRECTION

PATENT NO. : 9,850,626 B2
APPLICATION NO. : 15/155946
DATED : December 26, 2017
INVENTOR(S) : Busch et al.

Page 1 of 1

It is certified that error appears in the above-identified patent and that said Letters Patent is hereby corrected as shown below:

In the Claims

Column 10, Line 6 (Claim 1, Line 33) please change "join seal" to -- joint seal --.
Column 12, Line 7 (Claim 13, Line 12) please change "first harness" to -- first hardness --.

Signed and Sealed this
Twenty-seventh Day of March, 2018

Andrei Iancu
*Director of the United States Patent and Trademark Office*